United States Patent
Wu

(10) Patent No.: US 9,532,309 B2
(45) Date of Patent: Dec. 27, 2016

(54) CONTROL METHODS AND APPARATUSES OF MOBILE TERMINALS

(71) Applicant: MediaTek Singapore Pte. Ltd., Singapore (SG)

(72) Inventor: Hanyi Wu, Hefei (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/623,838

(22) Filed: Feb. 17, 2015

(65) Prior Publication Data

US 2015/0237579 A1    Aug. 20, 2015

(30) Foreign Application Priority Data

Feb. 18, 2014  (CN) .......................... 2014 1 0055384

(51) Int. Cl.
*H04W 52/02* (2009.01)

(52) U.S. Cl.
CPC ....... *H04W 52/0225* (2013.01); *H04W 52/027* (2013.01); *H04W 52/0254* (2013.01); *H04W 52/0258* (2013.01); *Y02B 60/50* (2013.01)

(58) Field of Classification Search
CPC ........... H04W 52/0225; H04W 52/027; H04W 52/0254; H04W 52/0258
See application file for complete search history.

(56) References Cited

U.S. PATENT DOCUMENTS

| | | | |
|---|---|---|---|
| 6,321,199 B1* | 11/2001 | Theimer et al. | 704/275 |
| 7,062,302 B2* | 6/2006 | Yamaoka | 455/574 |
| 2008/0248797 A1* | 10/2008 | Freeman et al. | 455/425 |
| 2009/0241686 A1* | 10/2009 | Bonnat | G01F 1/28 73/861.08 |
| 2010/0079370 A1* | 4/2010 | Kim | G06F 3/011 345/156 |
| 2010/0167788 A1* | 7/2010 | Choi | G06F 3/017 455/566 |
| 2011/0059733 A1* | 3/2011 | Kim et al. | 455/418 |
| 2011/0105190 A1* | 5/2011 | Cha et al. | 455/566 |
| 2014/0004908 A1* | 1/2014 | Park | H04W 88/02 455/566 |
| 2014/0120987 A1* | 5/2014 | Kim et al. | 455/563 |
| 2014/0122911 A1* | 5/2014 | Gunn | G06F 3/0488 713/323 |
| 2014/0244272 A1* | 8/2014 | Shao et al. | 704/275 |

* cited by examiner

*Primary Examiner* — Leon Flores
(74) *Attorney, Agent, or Firm* — McClure, Qualey & Rodack, LLP

(57) ABSTRACT

Control method and apparatus of a mobile terminal are provided. The control method includes the steps of collecting breathing signals generated by the breathing of a user, determining a breathing mode of the user according to the breathing signals collected and controlling the mobile terminal according to the determined breathing mode of the user. By doing so, the power consumption of the mobile terminal can be reduced and the battery life of the mobile terminal can also be extended.

22 Claims, 8 Drawing Sheets

CONTROL METHODS AND APPARATUSES OF MOBILE TERMINALS

CROSS REFERENCE TO RELATED APPLICATIONS

This application claims priority of China Patent Application No. 201410055384.7, filed on Feb. 18, 2014, the entirety of which is incorporated by reference herein.

BACKGROUND OF THE INVENTION

Field of the Invention

The application relates in general to a mobile terminal technical field, and in particular to a control method and apparatus of a mobile terminal.

Description of the Related Art

With the development of wireless communication technology, due to mobile terminals having much larger displays and more functions, the power consumption of mobile terminals has increased, causing the battery life of the mobile terminals to decrease, which is inconvenient for users.

In order to reduce the power consumption of the mobile terminal, a conventional control method for the mobile terminal is to turn off the display of the mobile terminal and enter a standby status after the mobile terminal has not performed any operations for a predetermined time.

Even though the conventional control method can control the mobile terminal to enter the standby status, but the condition is that the mobile terminal has not performed any operation in the predetermined time. Although the user has not used the mobile terminal within the predetermined time, the screen of the mobile terminal is still on, and power consumption is not minimized.

BRIEF SUMMARY OF INVENTION

An embodiment of the invention provides a control method of mobile terminal. The control method includes the steps of collecting breathing signals generated by the breathing of a user, determining a breathing mode of the user according to the collected breathing signals and controlling the mobile terminal according to the determined breathing mode of the user.

Another embodiment of the invention provides an apparatus of a mobile terminal. The apparatus includes a collection module and a control module. The collection module collects a breathing signal generated by the breathing of a user. The control module determines the breathing mode of the user according to the collected breathing signal.

The control methods and apparatuses of mobile terminals of the embodiments reduce the power consumption of the mobile terminal and further extend the battery life of the mobile terminal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

In the specification and claims which use some vocabularies to refer to some specific components, a person skilled in the art should understand that manufacturers may use different words to refer to the same components. The difference between the different components recited in the specification and the claims are not based on the name but the function. The word "couple" mentioned in the specification and the claims contains any direct and/or indirect electrical coupling means. Accordingly, if the first device is coupled to the second device, the first device may be coupled to the second device directly, or may indirectly be coupled to the second device through another device or coupling means. Accompanying drawings and the following embodiments of the invention will be described in detail.

Figure 1:
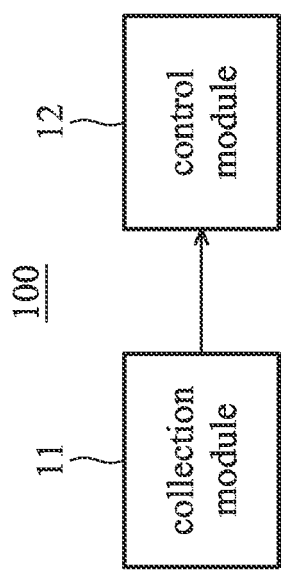
FIG. 1 is a schematic drawing of a control apparatus of the mobile terminal in accordance with the first embodiment of the invention.

FIG. 1 is a schematic drawing of a control apparatus of the mobile terminal in accordance with the first embodiment of the invention. As shown in FIG. 1, a control apparatus 100 of the mobile terminal comprises a collection module 11 and a control module 12. The mobile terminal could be any portable electronic device, for example, a mobile device, tablet computer, etc.

The collection module 11 is configured to collect a breathing signal according to the breathing of the user. The collection module 11 collects the breathing signal generated by the breathing of the user continually or every predetermined time period, and the predetermined time period can be set according to the actual situation. For example, the predetermined time period can be a pre-defined setting of the mobile terminal or can be adjusted by the user. In one embodiment, the collection module 11 is a temperature sensor, which is configured to detect the breathing of the user by detecting a temperature variation of the airflow from the breathing of the user, and output the breathing signal. In another embodiment, the collection module 11 is an airflow sensor, which is configured to detect the breathing of the user by detecting an air-pressure variation of the airflow from the breathing of the user, and output the breathing signal. The implementation structures and algorithms of the collection module 21 are not limited by the present invention, the collection module 21 can be any sensor which is used to detect the breathing of the user accurately by a person skilled in the art. It will not be discussed further herein.

The control module 12, which is coupled to the collection module 11, is configured to determine the breathing mode of the user according to the breathing signal collected by the collection module 11, and control the mobile terminal according to the determined breathing mode. The mobile terminal is controlled according to the determined breathing mode, specifically, the work status of the mobile terminal is controlled according to the determined breathing mode. The control module 12 can be achieved by the hardware, software or firmware.

In one embodiment, the control apparatus 100 can be disposed within the mobile terminal. When the mobile terminal is in the standby status, the control apparatus 100 is still in the powered operation status, and the power is provided by the battery of the mobile terminal.

Figure 2:
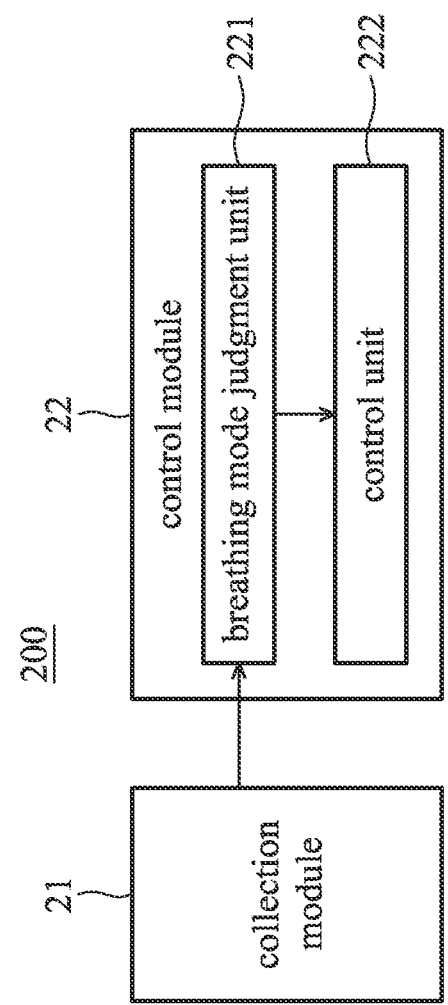
FIG. 2 is a schematic drawing of a control apparatus of the mobile terminal in accordance with the second embodiment of the invention.

FIG. 2 is a schematic drawing of a control apparatus of the mobile terminal in accordance with the second embodiment of the invention. As shown in FIG. 2, the control apparatus 200 of the mobile terminal includes the collection module 21 and the control module 22. The difference between the control apparatus 200 shown in FIG. 2 and the control apparatus 100 shown in FIG. 1 is that the control module 22 further includes a breathing mode judgment unit 221 and a control unit 222. The breathing mode judgment unit 221, which is coupled to the collection module 21, is configured to determine the breathing mode according to at least the current breathing signal and the previous breathing signal collected by the collection module 21. The breathing mode is configured to indicate whether the breathing of the user is detected or not, and further indicate whether the mobile terminal is being used by the user or not.

Specifically, when the current breathing signal collected by the collection module 21 indicates that the breathing of the user is not detected, and the collected previous breathing signal indicates that the breathing of the user is detected, the breathing mode judgment unit 221 determines that the breathing mode of the user is an interrupt-breathing mode, which means that the mode of the mobile terminal is changed from an active user status to a inactive user status. When the current breathing signal collected by the collection module 21 indicates that the breathing of the user is detected, and the collected previous breathing signal indicates that the breathing of the user is not detected, the breathing mode judgment unit 221 determines that the breathing mode of the user is a start-breathing mode, which means that the mode of the mobile terminal is changed from the inactive user status to the active user status.

When the previous breathing signal collected by the collection module 21 indicates that the breathing of the user is detected, and the previously collected breathing signal indicates that the breathing of the user is detected, the breathing mode judgment unit 221 determines that the breathing mode of the user is a continuous-breathing mode, which means that the mobile terminal is in the active user status.

When the previous breathing signal collected by the collection module 21 indicates that the breathing of the user is not detected, and the previous breathing signal indicates that the breathing of the user is not detected, the breathing mode judgment unit 221 determines that the breathing mode of the user is a non-breathing mode. Namely, the breathing of the user of the mobile terminal is not detected by the collection module 21, which means that the mobile terminal is in the inactive user status.

The control unit 222, which is coupled to the breathing mode judgment unit 221, is configured to control the mobile terminal according to the breathing mode determined by the breathing mode judgment unit 221, for example, the work status of the mobile terminal is controlled. For example, the control unit 222 can control whether the mobile terminal is in standby status or not, whether the display unit of the screen of the mobile terminal is activated or not, whether the screen of the mobile terminal is unlocked automatically or not. And the sound of the ringtones and the vibrations of the mobile terminal can also be controlled.

Specifically, when the breathing mode judgment unit 221 determines that the breathing mode is the interrupt-breathing mode, the control unit 222 controls the mobile terminal to work in standby status. Further, when the mobile terminal is in standby status, the screen of the mobile terminal is in off status.

When the breathing mode judgment unit 221 determines that the breathing mode is start-breathing mode, the control unit 222 unlocks the mobile terminal automatically. In another embodiment, when the breathing mode judgment unit 221 determines that the breathing mode is the start-breathing mode, the control unit 222 activates the display unit of the mobile terminal automatically. Further, after the mobile terminal is successfully unlocked, the status of the mobile terminal returns to the status it was in prior to entering standby status.

When the breathing mode judgment unit 221 determines that the breathing mode is the continuous-breathing mode, and the mobile terminal receives the external trigger signal, the control unit 222 sets the ringtone volume and/or the vibration amplitude of the mobile terminal as the lowest one. Furthermore, when the mobile terminal is called or when the mobile terminal receives a message, the mobile terminal receives the external trigger signal. In another embodiment, when the breathing mode judgment unit 221 determines that the breathing mode is the continuous-breathing mode, the control unit 222 controls the mobile terminal to work in the operation status. Further, when the mobile terminal is in work status, the screen of the mobile terminal is in an active status.

When the breathing mode judgment unit 221 determines that the breathing mode is the non-breathing mode, which indicates that the mobile terminal is remained in the standby status, and the mobile terminal receives the external trigger signal, the screen of the mobile terminal is controlled to remain off, and the ringtones and/or vibrations are in response to the external trigger signal.

In an embodiment, the control apparatus 200 can be disposed within the mobile terminal. When the mobile terminal is worked in standby status, the control apparatus 200 is still in the powered operation status, and the power is provided by the battery of the mobile terminal. So that when the mobile terminal is worked in standby status, the control apparatus can monitor the breathing mode of the user and control the work status of the mobile terminal continuously.

Figure 3:
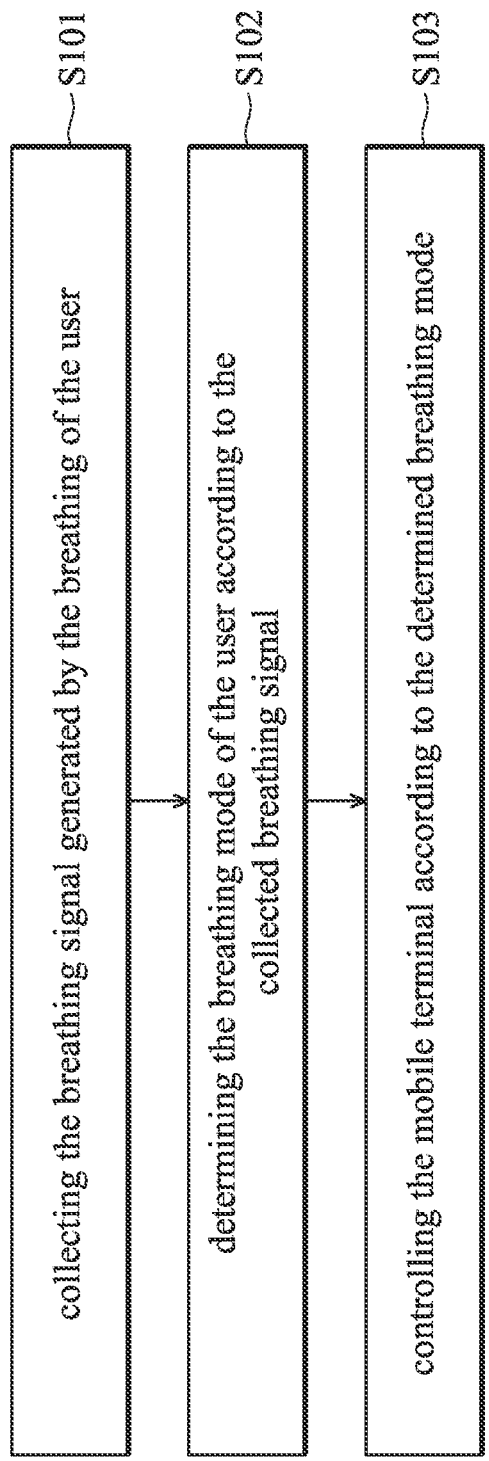
FIG. 3 is a flow chart of a control method of the mobile terminal in accordance with the first embodiment of the invention.

FIG. 3 is a flow chart of a control method of the mobile terminal in accordance with the first embodiment of the invention. For example, the method shown in FIG. 3 can be implemented by the control apparatus 100 shown in FIG. 1 or the control apparatus 200 shown in FIG. 2. It should be noted that if the result of the other method is substantially the same as the result of the method shown in FIG. 3, the sequence of the steps should not be limited to the steps recited in FIG. 3. As shown in FIG. 3, the method includes the following steps of:

step S101: collecting the breathing signal generated by the breathing of the user;

step S102: determining the breathing mode of the user according to the collected breathing signal;

step S103: controlling the mobile terminal according to the determined breathing mode.

In step S101, the breathing signal can be obtained according to the air-pressure change caused by the breathing of the user, the temperature change caused by the breathing of the user. The breathing signal also may be influenced by the breathing of another user. For example, when the breathing signal is obtained according to the air-pressure signal from the breathing of the user, firstly the pressure signal is collected by the pressure sensor, and then the simulated pressure signal is converted to the digital signal as the breathing signal by the AD converter. When the breathing signal is obtained according to the temperature signal from the breathing of the user, the temperature signal is collected by the temperature sensor firstly, and then the simulated temperature signal is converted to the digital signal as the breathing signal by the AD converter.

In step S102, the breathing mode of the user is determined according to the collected breathing signal. Specifically, the breathing mode of the user is determined at least according to the current breathing signal and the previous breathing signal.

In the embodiment of the present invention, the breathing mode includes at least four different modes: interrupt-breathing mode, start-breathing mode, continuous-breathing mode, and non-breathing mode. The interrupt-breathing mode corresponds to a behavior status in which the user has stopped the mobile terminal just recently, the start-breathing mode corresponds to a behavior status in which the user has started using the mobile terminal or using the mobile terminal once again, the continuous-breathing mode is corresponding to the behavior status that the user uses the mobile terminal continuously, and the non-breathing mode is corresponding to the behavior status that the user is not using the mobile terminal.

In step S103, the mobile terminal is controlled according to the breathing mode. Specifically, the work status of the mobile terminal is controlled according to the breathing mode. Power consumption of the mobile terminal can be greatly reduced by controlling the work status of the mobile terminal. For example, when the breathing mode is determined as the interrupt-breathing mode, namely the user is determined as having stopped using the mobile terminal, the mobile terminal is controlled to work in the standby status automatically for reducing the power consumption of the mobile terminal without affecting user experience. When the breathing mode is the non-breathing mode, namely the user is not using the mobile terminal, if the mobile terminal has the phone access, the screen of the mobile terminal is controlled to remain off, and only the ringtones and/or the vibrations of the mobile terminal can response to the external trigger signal for reducing the power consumption of the mobile terminal.

The control method of the mobile terminal in accordance with the first embodiment of the present invention collects the breathing signal generated by the breathing of the user, determines the breathing mode of the user according to the collected breathing signal, and controls the mobile terminal according to the breathing mode for reducing the power consumption of the mobile terminal and further extending the battery life of the mobile terminal.

Figure 4:
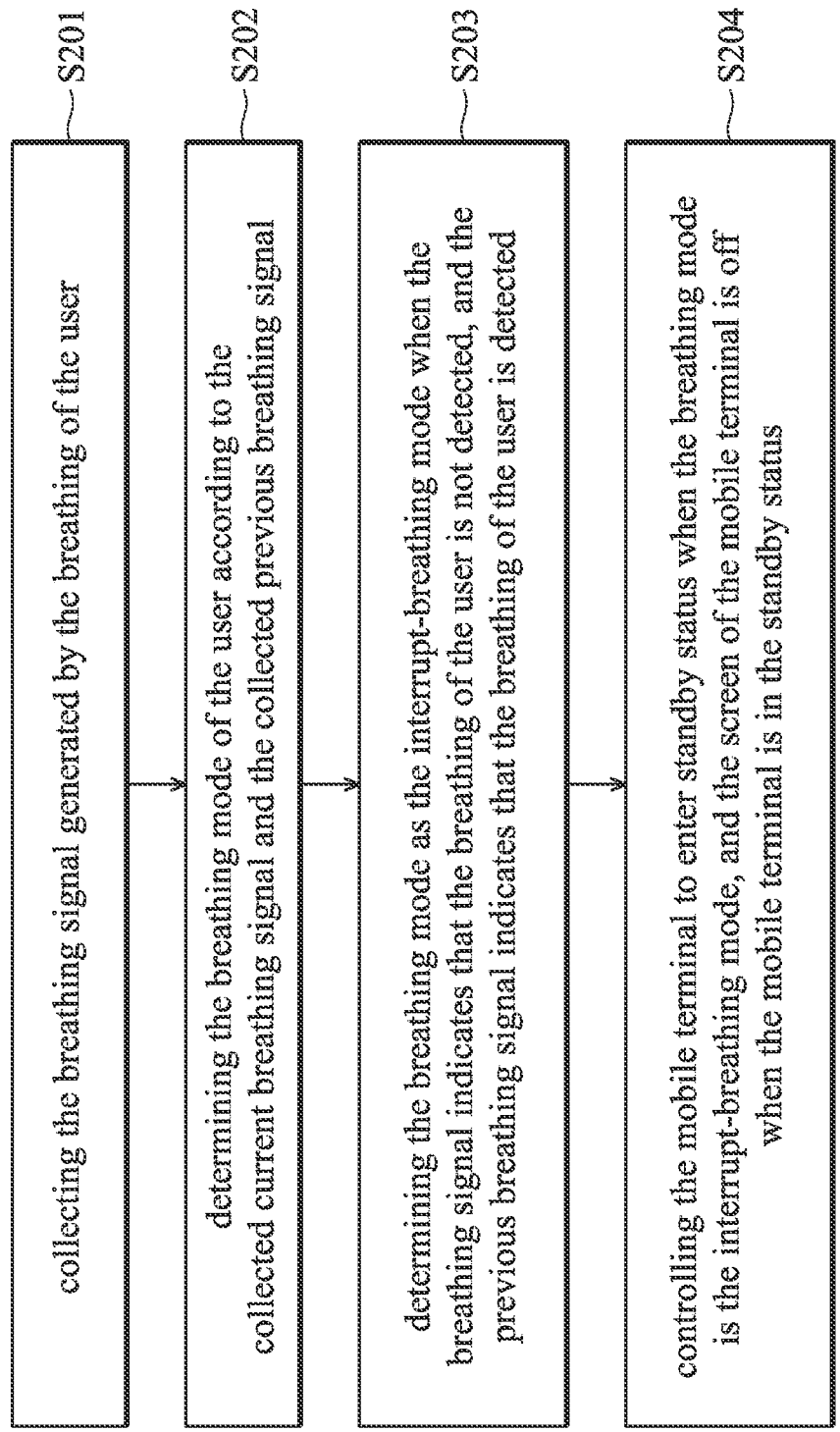
FIG. 4 is a flow chart of a control method of the mobile terminal in accordance with the second embodiment of the invention.

FIG. 4 is a flow chart of a control method of the mobile terminal in accordance with the second embodiment of the invention. For example, the method shown in FIG. 4 can be implemented by the control apparatus 100 shown in FIG. 1 or the control apparatus 200 shown in FIG. 2. It should be noted that if the result of the other method is substantially the same as the result of the method shown in FIG. 4, the sequence of the steps should not be limited to the steps recited in FIG. 4. As shown in FIG. 4, the method includes the steps of:

step S201: collecting the breathing signal generated by the breathing of the user. In the embodiment of the present invention, the step S201 is similar to the step S101 shown in FIG. 3, and it will not be described herein for brevity.

step S202: determining the breathing mode of the user according to the collected current breathing signal and the collected previous breathing signal. At step S202, the breathing signal is the discrete time sequence, and the interval of the sequence is the collection time of the breathing signal, and it can be set according to the actual situation. The value of the sequence is used to indicate whether the breathing of the user is detected or not.

step S203: determining the breathing mode as the interrupt-breathing mode when the current breathing signal indicates that the breathing of the user is not detected, and the previous breathing signal indicates that the breathing of the user is detected. The interrupt-breathing mode is corresponding to the behavior status that changed from the status in which the mobile terminal is in use by the user to the status in which the mobile terminal is not in used, namely the status that the user is stopped using the mobile terminal just recently.

step S204: controlling the mobile terminal to enter standby status when the breathing mode is the interrupt-breathing mode, and the screen of the mobile terminal is off when the mobile terminal is in the standby status. At step S204, the mobile terminal is controlled to enter the standby status automatically when the breathing mode is the interrupt-breathing mode. The standby mode refers to the status that the mobile terminal is powered on but not doing any substantive work, which is corresponding to the status that the mobile terminal saves most of the power. The display unit is off when the mobile terminal is in standby status, the power consumption of the mobile terminal will be greatly reduced after the screen is closed, and further the battery life of the mobile terminal is extended.

For example, in the prior art, when the user displays a video by using the mobile terminal, the screen of the mobile terminal is remained in active status in screen timeout time regardless of whether the user is using the mobile terminal or not. However, in the embodiment of the present invention, when the user displays the video by using the mobile terminal, and the breathing mode is detected as the interrupt-breathing mode, namely the user has left the mobile terminal just recently, the playback of the video will be suspended and the information corresponding to the suspension point of the suspended video will be remained, and the mobile terminal is controlled to enter the standby status for reducing the power consumption of the mobile terminal without affecting the user experience.

Figure 5:
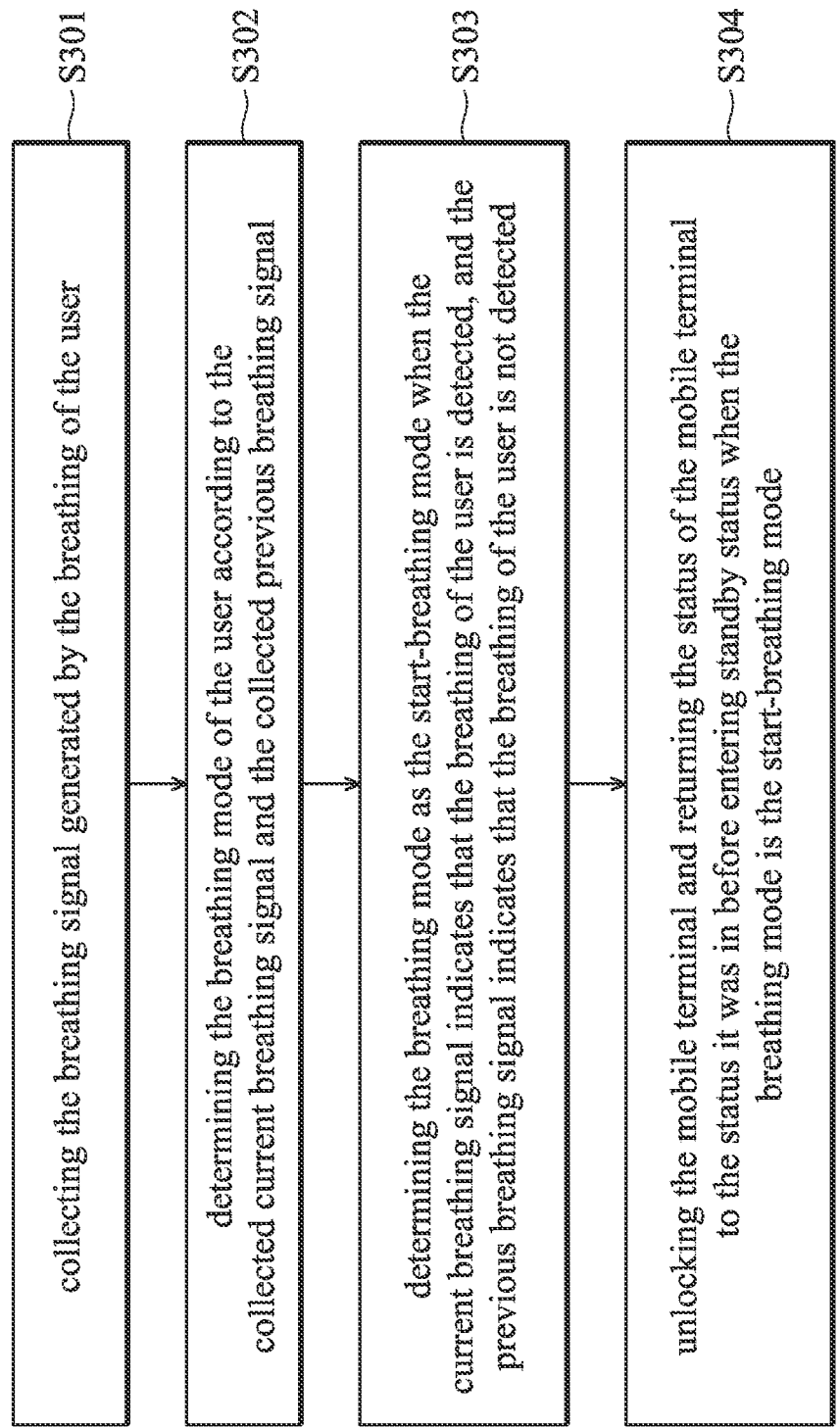
FIG. 5 is a flow chart of a control method of the mobile terminal in accordance with the third embodiment of the invention.

FIG. 5 is a flow chart of a control method of the mobile terminal in accordance with the third embodiment of the invention. For example, the method shown in FIG. 5 can be implemented by the control apparatus 200 of the mobile terminal shown in FIG. 2. It should be noted that, the method of the present invention is not limited that if the result of any method is substantially the same as the result of method shown in FIG. 5. As shown in FIG. 5, the method includes the steps of:

step S301: collecting the breathing signal generated by the breathing of the user. In the embodiment of the present invention, the step S301 is similar to the step S101 shown in FIG. 3, it will not be described herein for brevity.

step S302: determining the breathing mode of the user according to the collected current breathing signal and the collected previous breathing signal. In the embodiment of the present invention, the step S302 is similar to the step S202 shown in FIG. 4, it will not be described herein for brevity.

step S303: determining the breathing mode as the start-breathing mode when the current breathing signal indicates that the breathing of the user is detected, and the previous breathing signal indicates that the breathing of the user is not detected. At step S303, the breathing mode is determined as the start-breathing mode when the collected breathing signal is changed from the indication of the breathing of the user is not detected to the indication of the breathing of the user is detected. The start-breathing mode is corresponding to the behavior status that changed from the status that the mobile terminal is not used by the user to the status that the mobile terminal is used, namely the status that the user uses the mobile terminal once again. Further, the start-breathing mode also corresponding to the specific behavior status of the user, the behavior status of which the user opens the mobile terminal. Specifically, since the initial status of the breathing signal is set as one that indicates that the breathing of the user is not detected, and when the user opens the mobile terminal, the collected breathing signal indicates that the breathing of the user is detected, then the breathing mode of the user can be determined as the start-breathing mode, and the start-breathing mode also corresponding to the behavior status of the user opening the mobile terminal.

step S304: unlocking the mobile terminal and returning the status of the mobile terminal to the status it was in before entering standby status when the breathing mode is the start-breathing mode. At step S304, when the breathing mode is the start-breathing mode, the display unit of the mobile terminal is unlocked and awaked, and the work status of the mobile terminal returns to the status before entering the standby status, the situation described above is corresponding to the behavior status of using the mobile terminal once again. At step S304, when the breathing mode is the start-breathing mode, then the display unit of the mobile terminal is activated automatically for further operation by the user, the situation described above is corresponding to the behavior status of opening the mobile terminal by the user. The above mentioned two situations corresponding to the behavior status of the user are shown as examples, and persons skilled in the art should understand that it can be altered in other ways.

According to the example of the second embodiment of the present invention, the mobile terminal is unlocked automatically and the suspended point of the video is resumed for displaying the video continuously when the breathing mode of the user indicates that the interrupted breathing has been changed to the start-breathing mode, namely the user has started using the mobile terminal once again, and the power consumption of the mobile terminal will be greatly reduced for user to use the mobile terminal conveniently. A person skilled in the art should understand that the breathing mode of the user can be changed from the interrupt-breathing mode to the start-breathing mode directly, also the interrupt-breathing mode can be changed to another breathing mode, and then to the start-breathing mode, but it is not limited to the way recited herein.

According to the third embodiment of the present invention, when the control method of the mobile terminal determines that the breathing mode is the start-breathing mode, the mobile terminal is unlocked and the work status of the mobile terminal returns to the status that before entering to the standby status, the controlling of the mobile terminal will become more intelligent, and user experience is enhanced.

Figure 6:
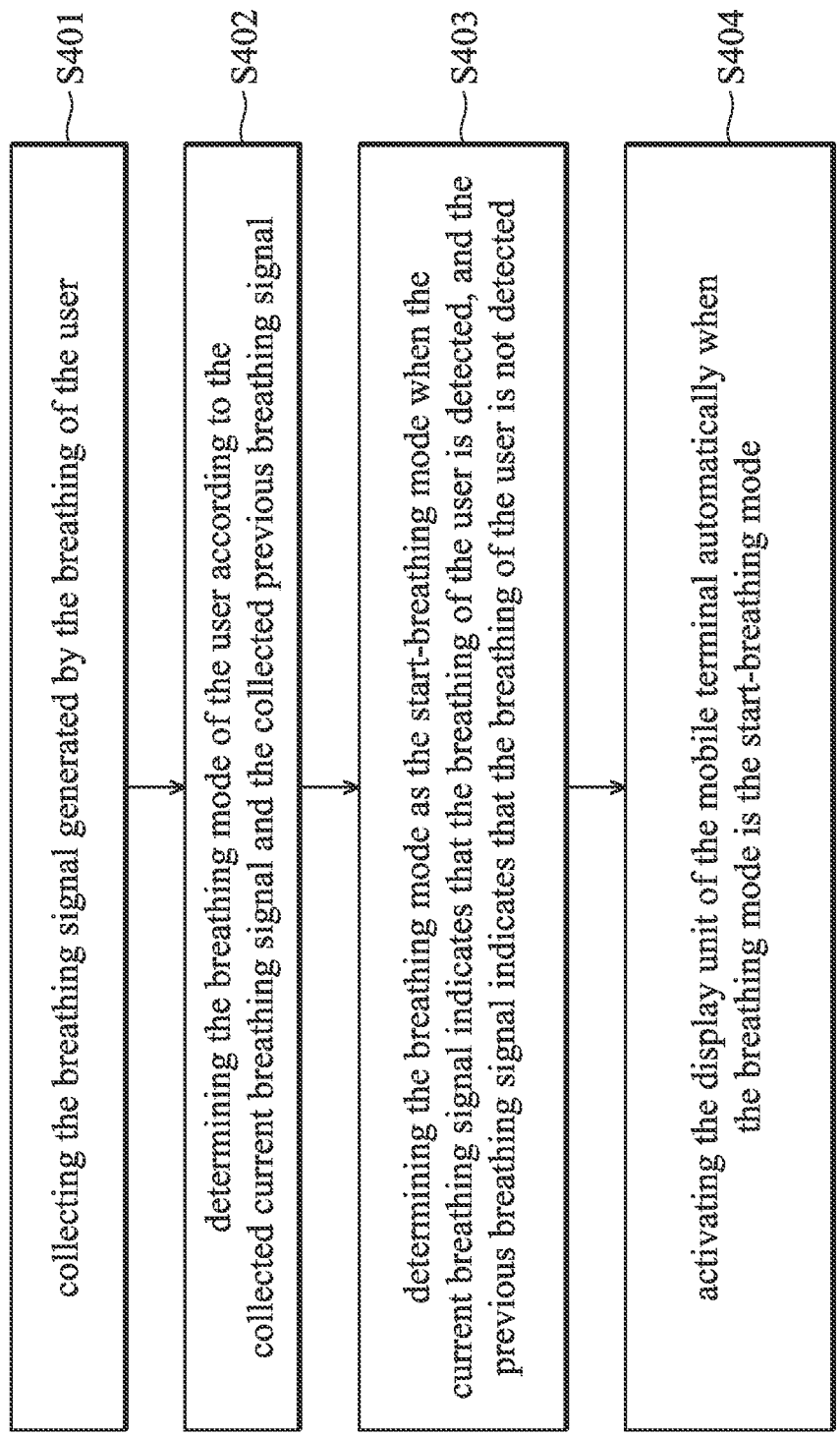
FIG. 6 is a flow chart of a control method of the mobile terminal in accordance with the fourth embodiment of the invention.

FIG. 6 is a flow chart of a control method of the mobile terminal in accordance with the fourth embodiment of the invention. For example, the method shown in FIG. 6 can be implemented by the control apparatus 200 of the mobile terminal shown in FIG. 2. It should be noted that if the result of the other method is substantially the same as the result of the method shown in FIG. 6, the sequence of the steps should not be limited to the steps recited in FIG. 6. As shown in FIG. 6, the method includes the steps of:

step S401: collecting the breathing signal generated by the breathing of the user. In the embodiment of the present invention, step S401 is similar to step S101 shown in FIG. 3, it will not be described herein for brevity.

step S402: determining the breathing mode of the user according to the collected current breathing signal and the collected previous breathing signal. In the embodiment of the present invention, the step S402 is similar to the step S202 shown in FIG. 4, it will not be described herein for brevity.

step S403: determining the breathing mode as the start-breathing mode when the current breathing signal indicates that the breathing of the user is detected, and the previous breathing signal indicates that the breathing of the user is not detected. In one embodiment, the start-breathing mode is corresponding to the behavior status of which the user opens the mobile terminal. Specifically, since the initial status of the breathing signal is set to indicate the breathing of the user is not detected, and when the user starts opening the mobile terminal, the collected breathing signal indicates that the breathing of the user is detected, then the breathing mode of the user can be determined as the start-breathing mode, and the start-breathing mode is also corresponding to the behavior status of the user opens the mobile terminal.

step S404: activating the display unit of the mobile terminal automatically when the breathing mode is the start-breathing mode. At step S404, when the breathing mode is the start-breathing mode, the display unit of the mobile terminal is activated automatically for further operation by the user, no matter the start-breathing mode is corresponding to the status that the mobile terminal is not used by the user changes to the status that the mobile terminal is used or the status that the mobile terminal is opened by the user.

Compared to the third embodiment, that the user can choose a setting to determine whether the mobile terminal can unlock itself when the breathing mode is the start-breathing mode. If the user chooses for the mobile terminal not to be able to unlock itself when the breathing mode is start-breathing mode, then even that the user uses the mobile terminal once again, the status of the mobile terminal returns to the status that before entering to the standby status after the user unlocks the mobile terminal by himself/herself, and the display unit will be activated just like which described in the fourth embodiment.

According to the fourth embodiment of the present invention, when the control method of the mobile terminal determines that the breathing mode is the start-breathing mode, activating the display unit of the mobile terminal automatically, the controlling of the mobile terminal will become more intelligent, and further the experience for the user is improved.

Figure 7:
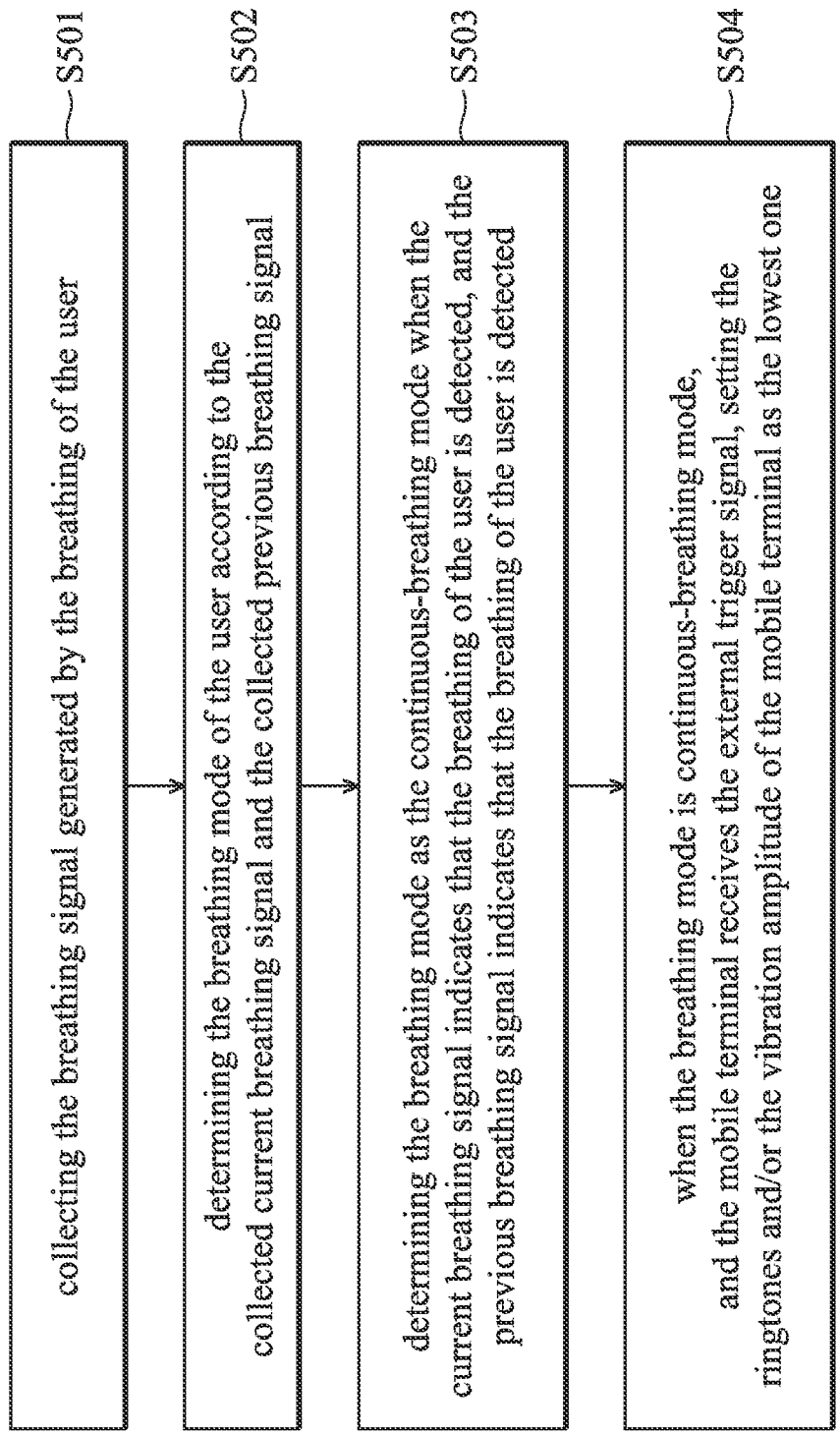
FIG. 7 is a flow chart of a control method of the mobile terminal in accordance with the fifth embodiment of the invention.

FIG. 7 is a flow chart of a control method of the mobile terminal in accordance with the fifth embodiment of the invention. For example, the method shown in FIG. 7 can be implemented by the control apparatus 200 of the mobile terminal shown in FIG. 2. It should be noted that, the method of the present invention is not limited that if the result of any method is substantially the same as the result of method shown in FIG. 7. As shown in FIG. 7, the method includes the steps of:

step S501: collecting the breathing signal generated by the breathing of the user. In the embodiment of the present invention, the step S501 is similar to the step S101 shown in FIG. 3, it will not be described herein for brevity.

step S502: determining the breathing mode of the user according to the collected current breathing signal and the collected previous breathing signal. In the embodiment of the present invention, the step S502 is similar to the step S202 shown in FIG. 4, it will not be described herein for brevity.

step S503: determining the breathing mode as the continuous-breathing mode when the current breathing signal indicates that the breathing of the user is detected, and the previous breathing signal indicates that the breathing of the user is detected. At step S503, the breathing mode is determined as the continuous-breathing mode when the collected breathing signal indicates that the breathing of the user is continuously detected. The continuous-breathing mode is corresponding to the behavior status that the user uses the mobile terminal continuously.

step S504: when the breathing mode is continuous-breathing mode, and the mobile terminal receives the external trigger signal, setting the ringtones and/or the vibration amplitude of the mobile terminal as the lowest one. At step S504, when the breathing mode is the continuous-breathing mode, after the mobile terminal receives the external trigger signal, it then reduces the ringtones and/or the vibration amplitude of the mobile terminal to reduce the power consumption of the mobile terminal. When the mobile terminal is called or the mobile terminal receives a message (for example, a web message), the mobile terminal receives the external trigger signal.

Persons skilled in the art should understand that when the breathing mode of the user is the continuous-breathing mode, which is corresponding to the behavior status that the mobile terminal is continuously used by the user, the distance between the user and the mobile terminal is really close, then the ringtones and/or the vibration amplitude of the mobile terminal is reduced, and it will not affect the use of the mobile terminal for the user, and further achieve the purpose of reducing the power consumption of the mobile terminal.

According to the fifth embodiment of the present invention, when the control method of the mobile terminal determines that the breathing mode is the continuous-breathing mode, the ringtones and/or the vibration amplitude of the mobile terminal are set as the lowest one for reducing the power consumption of the mobile terminal, and further extending the battery life of the mobile terminal.

Figure 8:
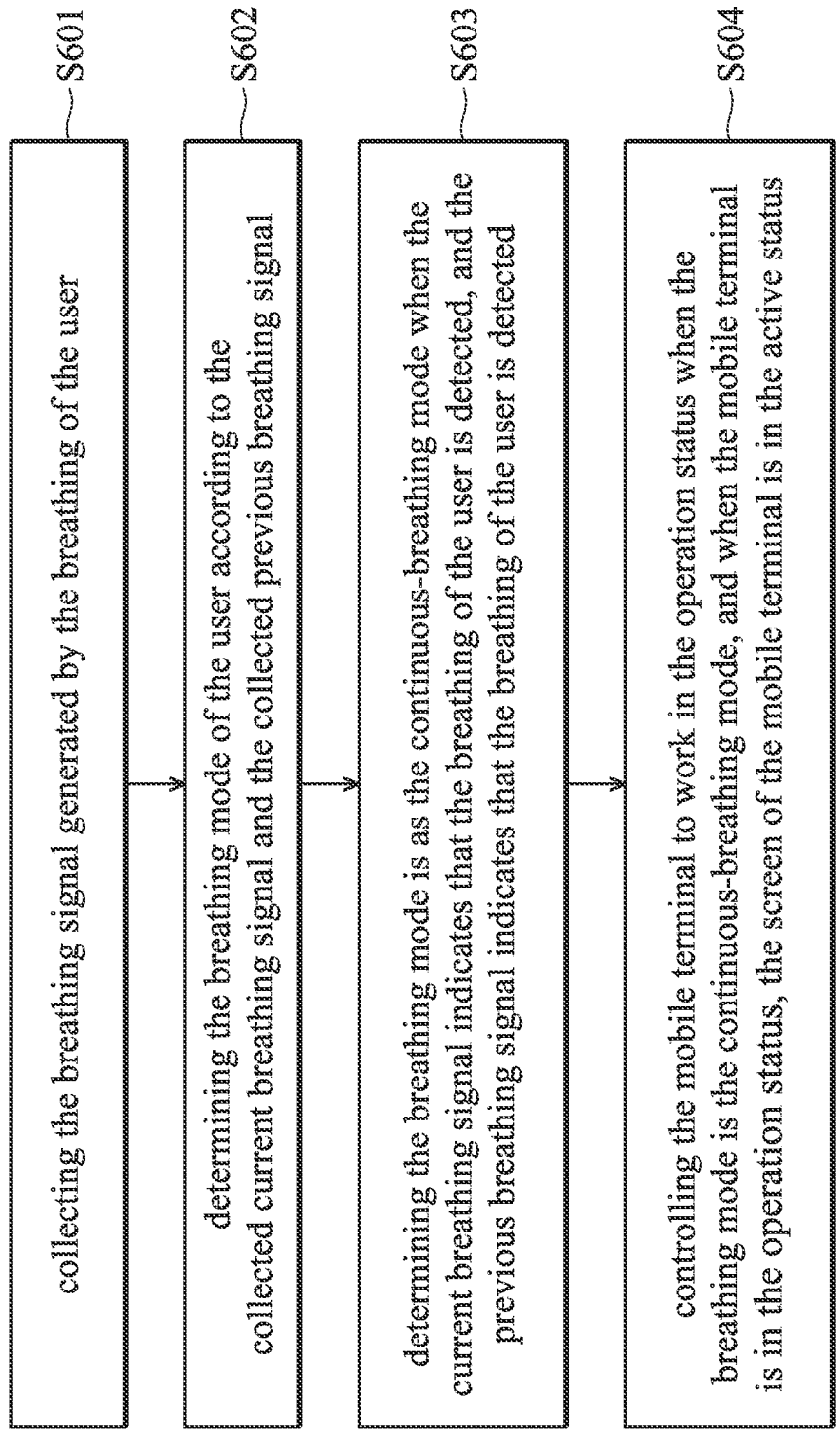
FIG. 8 is a flow chart of a control method of the mobile terminal in accordance with the sixth embodiment of the invention.

FIG. 8 is a flow chart of a control method of the mobile terminal in accordance with the sixth embodiment of the invention. For example, the method shown in FIG. 8 can be implemented by the control apparatus 200 of the mobile terminal shown in FIG. 2. It should be noted that, the method of the present invention is not limited that if the result of any method is substantially the same as the result of method shown in FIG. 8. As shown in FIG. 8, the method includes the steps of:

step S601: collecting the breathing signal generated by the breathing of the user. In the embodiment of the present invention, the step S601 is similar to the step S101 shown in FIG. 3, it will not be described herein for brevity.

step S602: determining the breathing mode of the user according to the collected current breathing signal and the collected previous breathing signal. In the embodiment of the present invention, the step S602 is similar to the step S202 shown in FIG. 4, it will not be described herein for brevity.

step S603: determining the breathing mode is as the continuous-breathing mode when the current breathing signal indicates that the breathing of the user is detected, and the previous breathing signal indicates that the breathing of the user is detected.

step S604: controlling the mobile terminal to work in the operation status when the breathing mode is the continuous-breathing mode, and when the mobile terminal is in the operation status, the screen of the mobile terminal is in the active status. At step S604, when the breathing mode is the continuous-breathing mode, the mobile terminal is not in the standby status or the screen of the mobile terminal is stopped to be off.

For example, in prior arts, when the user uses the mobile terminal to browse the web or read an e-book, if the user does not perform any operations on the mobile terminal while browsing, the screen will automatically turn off after the time for the screen timeout. However, in the embodiment of the present invention, when the user uses the mobile terminal to browse the web or read an e-book, if the breathing of the user is determined as the continuous-breathing mode, namely the user is using the mobile terminal continuously, then the mobile terminal is controlled to stay in the operation status that continuously browsing the web or read an e-book, the screen of the mobile terminal is stopped to be off for providing more humanized service, and further improve the experience for the user.

According to the sixth embodiment of the present invention, when the control method of the mobile terminal determines that the breathing mode is the continuous-breathing mode, the mobile terminal is controlled to work in the operation status, when the user uses the mobile terminal to browse the web or the E-book, more humanized service is provided, and further the experience for the user is improved.

Figure 9:
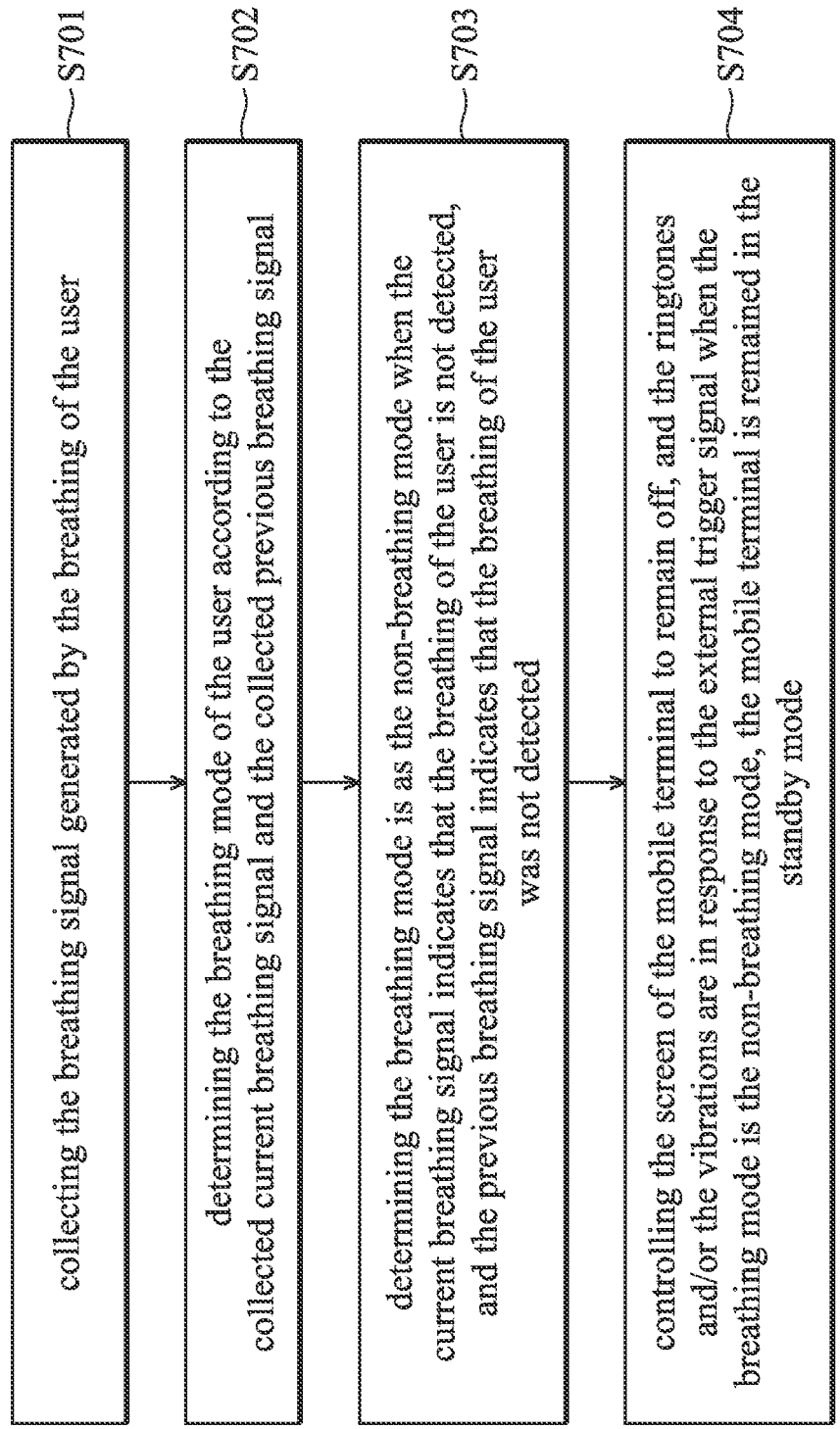
FIG. 9 is a flow chart of a control method of the mobile terminal in accordance with the seventh embodiment of the invention.

FIG. 9 is a flow chart of a control method of the mobile terminal in accordance with the seventh embodiment of the invention. For example, the method shown in FIG. 9 can be implemented by the control apparatus 200 of the mobile terminal shown in FIG. 2. It should be noted that, the method of the present invention is not limited that if the result of any method is substantially the same as the result of method shown in FIG. 9. As shown in FIG. 9, the method includes the steps of:

step S701: collecting the breathing signal generated by the breathing of the user. In the embodiment of the present invention, the step S701 is similar to the step S101 shown in FIG. 3, it will not be described herein for brevity.

step S702: determining the breathing mode of the user according to the collected current breathing signal and the collected previous breathing signal. In the embodiment of the present invention, the step S702 is similar to the step S202 shown in FIG. 4, it will not be described herein for brevity.

step S703: determining the breathing mode is as the non-breathing mode when the current breathing signal indicates that the breathing of the user is not detected, and the previous breathing signal indicates that the breathing of the user was not detected. At step S703, the breathing mode is determined to be the non-breathing mode when the collected breathing signal continuously indicates that the breathing of the user is not detected. The non-breathing mode is corresponding to the behavior status that the user does not use the mobile terminal continuously.

step S704: controlling the screen of the mobile terminal to remain off, and the ringtones and/or the vibrations are in response to the external trigger signal when the breathing mode is the non-breathing mode, the mobile terminal is remained in the standby mode, and the mobile terminal receives the external trigger signal. At step S704, when the breathing mode is the non-breathing mode, if the mobile terminal receives the external trigger signal, then the screen of the mobile terminal is remained off, and only the ringtones and/or the vibration can respond to the external trigger signal.

Specifically, person skilled in the art should be understood that, after the user powers on the mobile terminal, if the breathing mode needs to be changed to the non-breathing mode, it must go through the breathing mode of the interrupt-breathing mode. And according to the second embodiment which is shown in FIG. 4, when the breathing mode is in the interrupt-breathing mode, the mobile terminal is put in standby status and the screen of the mobile terminal turns off. Thus, when the breathing mode of the mobile terminal is changed from the interrupt-breathing mode to the non-breathing mode, for example due to the distance between the user and the mobile terminal being out of the normal range, even if the mobile terminal is called or the mobile terminal receives a message, the screen of the mobile terminal will not be turned on, namely the screen of the mobile terminal remains off, and the ringtones and/or the vibration is used to notify the user, thus reducing the power consumption of the mobile terminal greatly without affecting user experience.

According to the sixth embodiment of the present invention, when the control method of the mobile terminal determines that the breathing mode is the non-breathing mode, the mobile terminal is remained in the standby status, and the mobile terminal receives the external trigger signal, the ringtones and/or the vibrations are controlled to respond to the external trigger signal for reducing the power consumption of the mobile terminal greatly and further the battery life of the mobile terminal is extended without affecting the user experience.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A control method of a mobile terminal, comprising:
   collecting a breathing signal generated by breathing of a user;
   determining a breathing mode of the user according to the breathing signal, wherein the breathing mode is configured to indicate whether the breathing of the user is detected or not; and
   controlling a work status of the mobile terminal according to the breathing mode of the user to reduce a power consumption of the mobile terminal.

2. The control method as claimed in claim 1, wherein the step of determining the breathing mode of the user according to the breathing signal comprises:
   determining the breathing mode of the user at least according to a current breathing signal and a previous breathing signal.

3. The control method as claimed in claim 2, wherein the breathing mode is determined as an interrupt-breathing mode when the current breathing signal indicates that the breathing of the user is not detected and the previous breathing signal indicates that the breathing of the user is detected.

4. The control method as claimed in claim 3, wherein the step of controlling the mobile terminal according to the breathing mode comprises:
   controlling the mobile terminal to enter a standby status when the breathing mode is the interrupt-breathing mode, and a screen of the mobile terminal is in an off status when the mobile terminal enters the standby status.

5. The control method as claimed in claim 2, wherein the breathing mode is determined as a start-breathing mode when the current breathing signal indicates that the breathing of the user is detected, and the previous breathing signal indicates that the breathing of the user is not detected.

6. The control method as claimed in claim 5, wherein the step of controlling the mobile terminal according to the breathing mode comprises:
   unlocking the mobile terminal and returning a work status of the mobile terminal back to the status before entering the standby status when the breathing mode is the start-breathing mode; and
   activating a display unit of the mobile terminal automatically when the breathing mode is the start-breathing mode.

7. The control method as claimed in claim 2, wherein the breathing mode is determined as the continuous-breathing mode when the current breathing signal indicates that the breathing of the user is detected, and the previous breathing signal indicates that the breathing of the user is detected.

8. The control method as claimed in claim 7, wherein the step of controlling the mobile terminal according to the breathing mode comprises:
   setting ringtones and/or vibration amplitude of the mobile terminal at the lowest level when the breathing mode is the continuous-breathing mode and the mobile terminal receives an external trigger signal.

9. The control method as claimed in claim 7, wherein the step of controlling the mobile terminal according to the breathing mode comprises:
   controlling the mobile terminal to work in an operation status when the breathing mode is the continuous-breathing mode, and a screen of the mobile terminal is in an active status when the mobile terminal is in the work status.

10. The control method as claimed in claim 2, wherein the breathing mode is determined as a non-breathing mode when the current breathing signal indicates that the breathing of the user is not detected, and the previous breathing signal indicates that the breathing of the user is not detected.

11. The control method as claimed in claim 10, wherein the step of controlling the mobile terminal according to the breathing mode comprises:
   remaining the mobile terminal to work in a standby status when the breathing mode is the non-breathing mode, and controlling a screen of the mobile terminal to remain in an powered-off status when the mobile terminal receives an external trigger signal, and ringtones and/or vibrations are in response to the external trigger signal.

12. A control device of a mobile terminal comprises:
    a collection module, configured to collect a breathing signal generated by a breathing of a user;

a control module, configured to determine a breathing mode according to the breathing signal collected by the collection module, and control a work status of the mobile terminal according to the breathing mode of the user to reduce a power consumption of the mobile terminal, wherein the breathing mode is configured to indicate whether the breathing of the user is detected or not.

13. The control device as claimed in claim 12, wherein the control module comprises:
   a breathing mode judgment unit, configured to determine the breathing mode of the user at least according to a collected current breathing signal and a previous breathing signal;
   a control unit, configured to control the mobile terminal according to the breathing mode determined by the breathing mode judgment unit.

14. The control device as claimed in claim 13, wherein the breathing mode judgment unit determines that the breathing mode is a interrupt-breathing mode when the current breathing signal indicates that the breathing of the user is not detected, and the previous breathing signal indicates that the breathing of the user is detected.

15. The control device as claimed in claim 14, wherein the control unit controls the mobile terminal to work in a standby status when the breathing mode judgment unit determines that the breathing mode is the interrupt-breathing mode.

16. The control device as claimed in claim 13, wherein the breathing mode judgment unit determines that the breathing mode of the user is a start-breathing mode when the current breathing signal indicates that the breathing of the user is detected, and the previous breathing signal indicates that the breathing of the user is not detected.

17. The control device as claimed in claim 16, wherein the control unit unlocks the mobile terminal automatically, and resumes the mobile terminal back to the status before entering the standby status when the breathing mode judgment unit determines that the breathing mode is the start-breathing mode; and
   wherein a display unit of the mobile terminal is activated automatically when the breathing mode judgment unit determines that the breathing mode is the start-breathing mode.

18. The control device as claimed in claim 12, wherein the breathing mode judgment unit determines that the breathing mode is a continuous-breathing mode when the current breathing signal indicates that the breathing of the user is detected, and the previous breathing signal indicates that the breathing of the user is detected.

19. The control device as claimed in claim 18, wherein the control unit sets ringtones and/or vibration amplitude of the mobile terminal as the lowest one when the breathing mode judgment unit determines that the breathing mode is the continuous-breathing mode, and the mobile terminal receives an external trigger signal.

20. The control device as claimed in claim 18, wherein the control unit controls the mobile terminal to work in an operation status when the breathing mode judgment unit determines that the breathing mode is the continuous-breathing mode, and a screen of the mobile terminal is in an active status when the mobile terminal is in the operation status.

21. The control device as claimed in claim 12, wherein the breathing mode judgment unit determines that the breathing mode is a non-breathing mode when the current breathing signal indicates that the breathing of the user is not detected, and the previous breathing signal indicates that the breathing of the user is not detected.

22. The control device as claimed in claim 21, wherein the mobile terminal is remained to work in a standby status when the breathing mode judgment unit determines that the breathing mode is the non-breathing mode, and a screen of the mobile terminal is controlled to remain in an powered-off status when the mobile terminal receives an external trigger signal, and ringtones and/or vibrations are in response to the external trigger signal.

* * * * *